United States Patent
Hobbs

(10) Patent No.: US 7,444,584 B1
(45) Date of Patent: Oct. 28, 2008

(54) METHOD AND SYSTEM FOR FORMULAICALLY REDIRECTING AND MODIFYING FORMULA SET OPERATIONS IN A SPREADSHEET APPLICATION

(75) Inventor: Craig A. Hobbs, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 470 days.

(21) Appl. No.: 10/813,418

(22) Filed: Mar. 30, 2004

(51) Int. Cl.
G06F 17/00 (2006.01)
G06F 17/28 (2006.01)

(52) U.S. Cl. ............... 715/212; 715/220; 715/267

(58) Field of Classification Search ............ 715/503, 715/504, 530, 212, 217, 219, 220, 255, 267
See application file for complete search history.

(56) References Cited

U.S. PATENT DOCUMENTS

| | | | | |
|---|---|---|---|---|
| 5,499,180 | A * | 3/1996 | Ammirato et al. | 715/503 |
| 5,708,827 | A * | 1/1998 | Kaneko et al. | 715/503 |
| 5,721,847 | A * | 2/1998 | Johnson | 715/786 |
| 5,883,623 | A * | 3/1999 | Cseri | 715/866 |
| 5,890,174 | A * | 3/1999 | Khanna et al. | 715/504 |
| 5,893,123 | A * | 4/1999 | Tuinenga | 715/504 |
| 6,157,934 | A * | 12/2000 | Khan et al. | 715/503 |
| 6,225,996 | B1 * | 5/2001 | Gibb et al. | 715/503 |
| 6,430,584 | B1 * | 8/2002 | Comer et al. | 715/503 |
| 6,438,565 | B1 * | 8/2002 | Ammirato et al. | 715/503 |
| 6,640,234 | B1 * | 10/2003 | Coffen et al. | 715/503 |
| 6,701,485 | B1 * | 3/2004 | Igra et al. | 715/503 |
| 7,082,569 | B2 * | 7/2006 | Voshell | 715/503 |
| 7,266,763 | B2 * | 9/2007 | Peyton-Jones et al. | 715/503 |
| 2002/0091871 | A1 * | 7/2002 | Cahill et al. | 709/315 |
| 2004/0044954 | A1 * | 3/2004 | Hosea | 715/503 |

FOREIGN PATENT DOCUMENTS

WO    WO 02/17074    *  2/2002

OTHER PUBLICATIONS

A. Gupta, "Application of PC Spreadsheet Software for Non-linear Parameter Optimization", JCPT, vol. 37, No. 3, Mar. 1998, pp. 51-54.*
P. Blattner et al., "Microsoft Excel Functions in Practice", Sep. 1999, pp. 1-14.*

(Continued)

*Primary Examiner*—Doug Hutton
*Assistant Examiner*—Maikhanh Nguyen
(74) *Attorney, Agent, or Firm*—Merchant & Gould; Ryan T. Grace

(57) ABSTRACT

Methods and systems are provided for formulaically redirecting and modifying formula set operations in a spreadsheet application. A spreadsheet application may link the contents of one spreadsheet cell to other spreadsheet cells so that changes in one cell are reflected in linked cells. Three spreadsheet functions are provided which allow for formulaically redirecting and modifying formula set operations in a spreadsheet application. A first spreadsheet function, SETATREF, redirects a formula set in one spreadsheet cell to another spreadsheet cell. The SETATREF function may also allow a formula set to one spreadsheet cell to be redirected to and modified in a second spreadsheet cell. A second spreadsheet function, SETATREFEXPR, redirects a formula set to a formulaic location within a spreadsheet cell. A third function, SETATREFEVAL, allows for an evaluation of a formula at formula set-time.

10 Claims, 4 Drawing Sheets

OTHER PUBLICATIONS

C. Dasgupta et al., "Excel Spreadsheet Tutorial", Revised Feb. 1999, pp. 2-58.*

Shiozawa et al., "3D Interactive Visualization for Inter-Cell Dependencies of Spreadsheet", Department of Information and Computer Science, Keio University, Yokohama Japan, pp. 1-4, no date.*

M. Chipman, "Editing XML Data with Microsoft Office Word 2003 and Microsoft Office Excel 2003", MCW Technologies, Feb. 2004, pp. 1-8.*

* cited by examiner

METHOD AND SYSTEM FOR FORMULAICALLY REDIRECTING AND MODIFYING FORMULA SET OPERATIONS IN A SPREADSHEET APPLICATION

FIELD OF THE INVENTION

The present invention generally relates to spreadsheet application systems. More particularly, the present invention relates to formulaically redirecting and modifying formula set operations in a spreadsheet application.

BACKGROUND OF THE INVENTION

Spreadsheet applications provide many well known benefits including data organization, computation, analysis and presentation. Some popular spreadsheet applications provide users worksheets and shapesheets comprised of cells in which data may be entered, computed and related to data in other cells. For example, a spreadsheet worksheet may allow a user to enter and total sales figures. Mathematical formulas may be applied to spreadsheet cells to perform desired calculations on data contained in one or more cells. Spreadsheet application shapesheets allow users to create drawings, images, flowcharts and the like. In such shapesheets, data may be applied to cells comprising the shapesheet for controlling properties such as shape, width, height and the like.

In a typical spreadsheet engine operating such spreadsheet worksheets and shapesheets, there are often two or more cells that represent the same data. For example, a first cell may include a value represented in integer form (for example, number of units on hand). A second cell may represent the same data, but in percentage form (for example, percentage of total inventory). A third cell may have related data (for example, total number of units in inventory). In the context of a spreadsheet shapesheet, a first cell may have data representing the width of an image, while a second cell may have the same data expressed as a relationship of the width of the image to the width of text written on the image. In such situations, it would be desirable to allow a user to enter the value of the related cells in either form (e.g., integer or percentage) and have each cell reflect the change. Unfortunately, prior spreadsheet systems do not allow for the formulaic redirection and/or modification of formulas applied to one cell for affecting changes to another related cell during formula set operations.

Accordingly, there is a need in the art for a method and system for linking the contents of one spreadsheet cell to another spreadsheet cell so that changes in one cell are reflected in the linked cell. There is further a need for a method and system for linking the contents of one spreadsheet cell to another spreadsheet cell so that changes in one cell are reflected in the linked cell particularly where the contents of the two cells are the same quantity presented in different forms.

It is with respect to these and other considerations that the present invention has been made.

SUMMARY OF THE INVENTION

Embodiments of the present invention solve the above and other problems by providing a method and system for formulaically redirecting and modifying formula set operations in a spreadsheet application. Generally described, embodiments of the present invention allow a spreadsheet application to link the contents of one spreadsheet cell to other spreadsheet cells so that changes in one cell are reflected in linked cells.

More particularly described, in a spreadsheet application, three novel spreadsheet functions are provided which allow for formulaically redirecting and modifying formula set operations in a spreadsheet application. A first spreadsheet function, SETATREF, redirects a formula set in one spreadsheet cell to another spreadsheet cell. The SETATREF function may also allow a formula set to one spreadsheet cell to be redirected to and modified in a second spreadsheet cell. A second spreadsheet function, SETATREFEXPR, redirects a formula set to a formulaic location within a spreadsheet cell. Accordingly, if the SETATREFEXPR function is present in a cell's formula when a formula is set (set-time) in that cell, then each argument of the SETATREFEXPR function is replaced by the formula being set. A third function, SETATREFEVAL, allows for an evaluation of a formula at formula set-time. When the SETATREFEVAL expression is evaluated at set-time, the SETATREFEVAL expression included in the SETATREFEVAL function is replaced with the evaluated result.

In operation, at spreadsheet application set-time, when a formula is set into a spreadsheet cell, the set formula is obtained for inspection by the spreadsheet application. The formula is inspected for redirection and/or modification via one or more of the above spreadsheet functions. The formula is then modified, if required, and redirected to a specified cell, and any required expression evaluation is performed as specified by the functions present in the formula.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to methods and systems for formulaically redirecting and modifying formula set operations in a spreadsheet application. Embodiments of the present invention allow a spreadsheet application to link the contents of one cell to other cells so that changes made in one cell are reflected in the linked cells. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
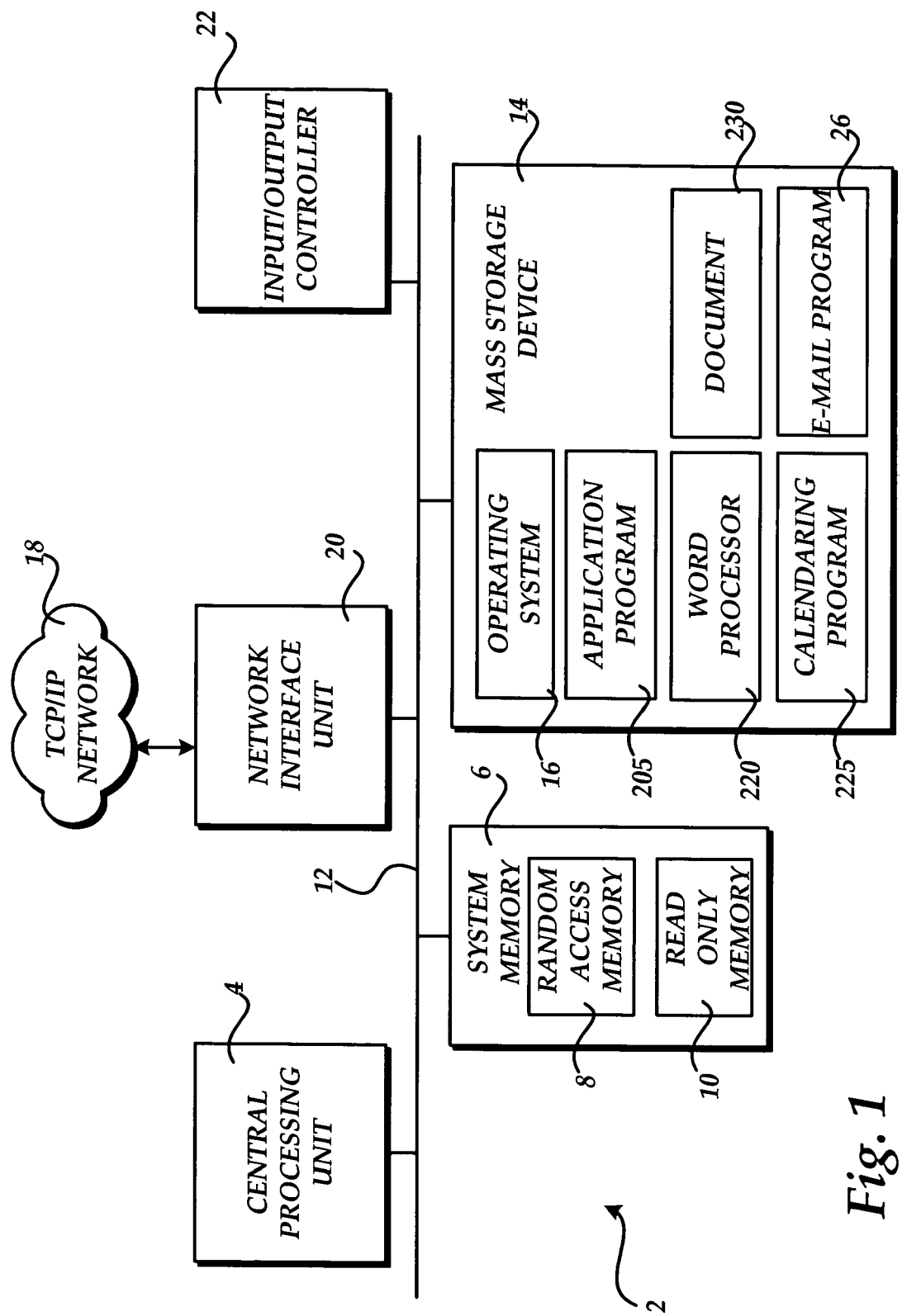
FIG. 1 is a block diagram showing the architecture of a personal computer that provides an illustrative operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 205 for creating and editing an electronic document 24. For instance, according to embodiments of the present invention, the application program 205 may comprise a spreadsheet application 210 as described with reference to FIG. 2 below. Other applications illustrated in FIG. 1 and applicable to embodiments of the present invention include the word processing application 220, the calendar application 225 and the electronic mail application 26.

Figure 2:
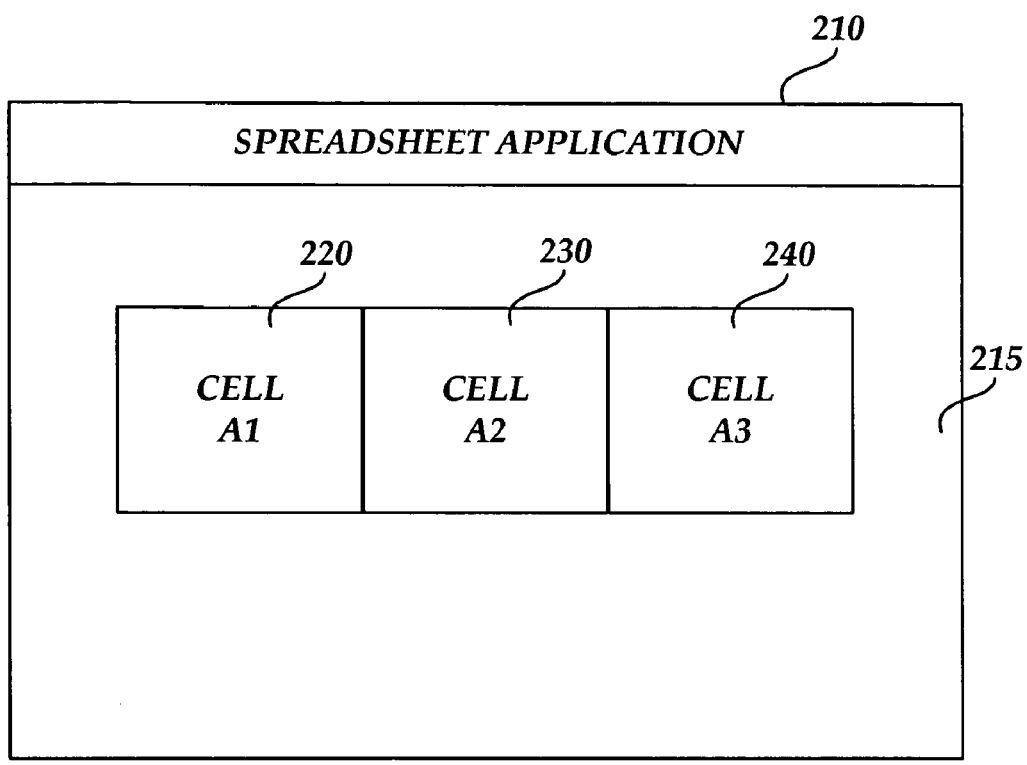
FIG. 2 is a simplified block diagram illustrating a spreadsheet application worksheet or shapesheet according to embodiments of the present invention.

FIG. 2 is a simplified block diagram illustrating a spreadsheet application worksheet or shapesheet according to embodiments of the present invention. The spreadsheet application 210 illustrated in FIG. 2 includes a spreadsheet worksheet 215 or spreadsheet shapesheet 215. A plurality of spreadsheet cells are illustrated including cell A1 (220), cell A2 (230) and cell A3 (240). According to one embodiment of the present invention, the spreadsheet application 210 is illustrative of a spreadsheet application for entering, calculating, manipulating, and displaying data of various forms. An exemplary spreadsheet application 210 includes EXCEL manufactured by Microsoft Corporation of Redmond, Wash. Using such a spreadsheet application 210, a user may enter data into each of the cells 220, 230, 240, and the user may calculate, manipulate, and display such data. For example, the user may enter inventory-on-hand information as a percentage of maximum inventory, for example 20%, into cell A1. The user may enter a value for the total inventory on hand, for example, 200 units, in the cell A2. The user may enter a value for the maximum inventory, for example 1,000 units, into cell A3. Subsequently, the user may utilize the spreadsheet application 210 to compute valuable data and create valuable presentations associated with the user's inventory data. According to embodiments of the present invention, and as described in detail below, the content of one cell of the spreadsheet application 210 may be linked to other cells in the spreadsheet application 210 so that changes made to data in one cell may be reflected in other linked cells.

As mentioned above, the spreadsheet application 210 and spreadsheet 215 are also illustrative of a shapesheet 215 on which a user may create drawings, import images, and the like. An exemplary shapesheet spreadsheet application is VISIO manufactured by Microsoft Corporation of Redmond, Wash. According to such spreadsheet applications, the shapesheet 215 allows the user to create drawings, import images and the like such as FIGS. 1, 2 and 3 of this patent document. The cells 220, 230, 240 of the shapesheet may include data not visible to the user, but which controls the presentation of a drawing or image displayed on the sheet 215. For example, the first cell A1 (220) may include data representing the width of an image displayed on the sheet 215. The second cell A2 (230) may contain data representing the height of that image as a function of the width of the image. The third cell A3 (240) may contain data representing text written on the image. According to embodiments of the present invention, the data contained in the cells 220, 230, 240 may be linked to other cells such that changes made to data contained in any of the cells 220, 230, 240 are reflected in related data in linked cells.

To allow for the improved formulaic redirection and/or modification of spreadsheet cell formulas during formula set-time operations, described herein, three novel spreadsheet functions are provided. As described herein, the three novel spreadsheet functions are provided according to a generic spreadsheet computing language such as that found in Microsoft Visio or Microsoft Excel. However, it should be appreciated that the functionality of the present invention may be utilized according to any suitable computing language for programming and utilizing spreadsheet applications.

According to embodiments of the present invention, the three novel spreadsheet functions described below allow for described behavior at spreadsheet cell set-time. Set-time behavior is behavior that is invoked when a formula is set to a spreadsheet cell, as opposed to when the formula is evaluated or recalculated. The three novel spreadsheet functions described herein will be described in detail below and include:

SETATREF—Redirect a formula set to another cell;

SETATREFEXPR—Redirect a formula set to a formulaic location within a cell; and

SETATREFEVAL—An evaluation scope within a SETATREF.

In the example spreadsheet described above in FIG. 2m consider, for example, that cell A1 contains a value expressed as a percentage, cell A2 contains a value expressed as a whole number, and cell A3 contains a value expressed as a maximum total number of units. The formulas for the cells may be defined as:

A1=1%

A2=SETATREF(A1,SETATREFEVAL (SETATREFEXPR(10)/A3))*A3

A3=1000.

According to this example, the formula for cell A3 is simply a number. For the formula in cell A2, if the user enters a new value or formula into cell A2, the existing formula (above) is examined for any SETATREFEXPR functions. If, for example, the user enters a value of 200 units, the new formula for cell A2 becomes A2=SETATREF(A1, SETATREFEVAL(SETATREFEXPR(200)/A3))*A3 which becomes the new "set-formula". The formula is now examined for any SETATREF functions. The SETATREF function present has a set-expression argument, SETATREFEVAL (SETATREFEXPR(200)/A3)). This is evaluated as 200/1000=0.2. This result formula is set to the cell referenced by the SETATREF function's reference argument, A1. The modified set-formula is set to cell A2. Cell A1 must now recalculate. This, in turn, causes cell A2 to recalculate because cell A2 refers to cell A1. The result of the SETATREF function is the dereferenced value of its first argument, A1, which is 0.2, and cell A2 evaluates to 0.2*1000 or 200. Now, consider for another example that the user sets the formula as a percent in cell A1 (e.g., the user types 40% into cell A1). Cell A1 is recalculated to 40%. This causes cell A2 to recalculate in the fashion described above—SETATREF(A1, SETATREFEVAL( SETATREFEXPR(200)/A3)) *A3=40%*1000=400.

The three novel spreadsheet functions described by example above are described in further detail below. As mentioned above, each of these functions has associated "set-time" behavior. Set-time behavior is invoked when a new formula is set to a cell that already contains a formula containing a function with set-time behavior. As will be appreciated, overriding the SETATREF function and the SETATREFEXPR function set-time behavior may be necessary when editing/modifying/debugging a spreadsheet in order to ignore the set-time behavior of these functions. This allows a formula containing the SETATREF function and the SETATREFEXPR function to be modified once it is set. The set-time behavior and evaluation-time behavior for the functions SETATREF, SETATREFEXPR, and SETATREFEVAL are described here.

The first function, SETATREF, has a format of SETATREF (reference, [expression to set], [eval as zero]). The SETATREF function allows a formula set operation to be redirected and/or modified to another spreadsheet cell. The SETATREF function has three arguments. The reference argument, which is a required argument is associated with a cell reference at which to set the formula (the redirect cell). If this argument is an expression then the expression is evaluated at set-time to produce a cell reference. This allows formula set operations to be conditionally redirected. For example, if the SETATREF function includes SETATREF(If (A1, A2, A3)), then if A1 is true the SETATREF function will redirect to cell A2. If A1 is not true, then the SETATREF function will redirect to cell A3. At set-time this argument is de-referenced to produce the result of the SETATREF function unless evaluate to zero is true for the function.

The expression to set argument of the SETATREF function is optional and identifies the expression to set at the redirect cell. This expression typically will contain one or more SETATREFEXPR functions and/or SETATREFEVAL functions, described below. If a SETATREFEVAL function is present in the expression to set argument, the SETATREFEVAL function is replaced by the evaluated result of the first argument of the SETATREFEVAL function. The expression to set argument is necessarily stripped of all set-time functions (SETATREF and SETATREFEXPR) before setting at the redirect cell. The eval to zero argument of the SETATREF function is also optional. If eval to zero argument is true, the SETATREF function returns a value of zero (0) when evaluated. If eval to zero argument is not true, the SETATREF function returns the de-referenced value of its reference argument when evaluated.

The second function, SETATREFEXPR, has a format of SETATREFEXPR([Expression], [expression to set]). The SETATREFEXPR function redirects a formula set to a formulaic location within a spreadsheet cell. If the SETATREFEXPR function is present in a cell's formula when a formula is set (set-time) in that cell, then expression argument of the SETATREFEXPR function is replaced by the formula being set. The expression argument of the SETATREFEXPR function is optional and may include an arbitrary expression. If an expression is provided, the result of SETATREFEXPR function is the result of the provided expression. If this argument is not provided, then the result is zero (0) when evaluated.

The expression to set argument of the SETATREFEXPR function is optional and identifies the expression to use when replacing the expression argument of the SETATREFEXPR function. This expression typically will contain one or more SETATREFEXPR functions and/or SETATREFEVAL functions, described below. If a SETATREFEVAL function is present in the expression to set argument, the SETATREFE- VAL function is replaced by the evaluated result of the first argument of the SETATREFEVAL function. The expression to set argument is necessarily stripped of all set-time functions (SETATREF and SETATREFEXPR) before replacing the expression argument.

The third function, SETATREFEVAL, has a format of SETATREFEVAL(Expression). The SETATREFEVAL function allows for an evaluation of a formula at formula set-time. The expression argument of the SETATREFEVAL function identifies the expression to evaluate at formula set-time. If the SETATREFEVAL function is present in the second argument (Expression to Set) of SETATREF or SETATREFEXPR function, then the SETATREFEVAL expression is evaluated at set-time, and the SETATREFEVAL function is replaced with the evaluated result in the formula to set.

Under certain conditions, circular SETATREF function chains may be created. That is, it is possible to create circular dependencies using the SETATREF function, for example, cell A1 redirects to cell A2 that redirects back to cell A1. If this condition is not corrected, an infinite loop may be created when processing a formula set to cell A1 or cell A2. To solve this problem a maximum depth may be enforced on SETATREF function operations. If the maximum depth is exceeded, then the formula being set is set ignoring the SETATREF function and the SETATREFEXPR function that results in overwriting the undesirable behavior.

To avoid an undesirable behavior of a spreadsheet function, the functions may also be removed from a formula or spreadsheet cell, for example, removal of the SETATREF function and the SETATREFEXPR function in formulas set via SETATREF. According to an embodiment, function removal is performed when setting a formula via a SETATREF function to avoid unintended behavior. An exemplary method for function removal includes replacing the function call with the first argument (0 if none) while not changing the order of evaluation. For example, the formula "SETATREFEXPR(7+A1)*A2" becomes "(7+A1)*A2" after removal of the SETATREFEXPR function from the formula.

According to embodiments of the invention, references in formulas may be adjusted via a SETATREF function. References in the target context should remain references to the same cell as in the source context. In other words, relative references may need to be made absolute references. For example, in Microsoft Visio, "SETATREF(Sheet.2!Width, SETATREFEXPR(5)/Width)" will set "5/Sheet.1!Width" at the Sheet.2!Width cell.

Figure 3:
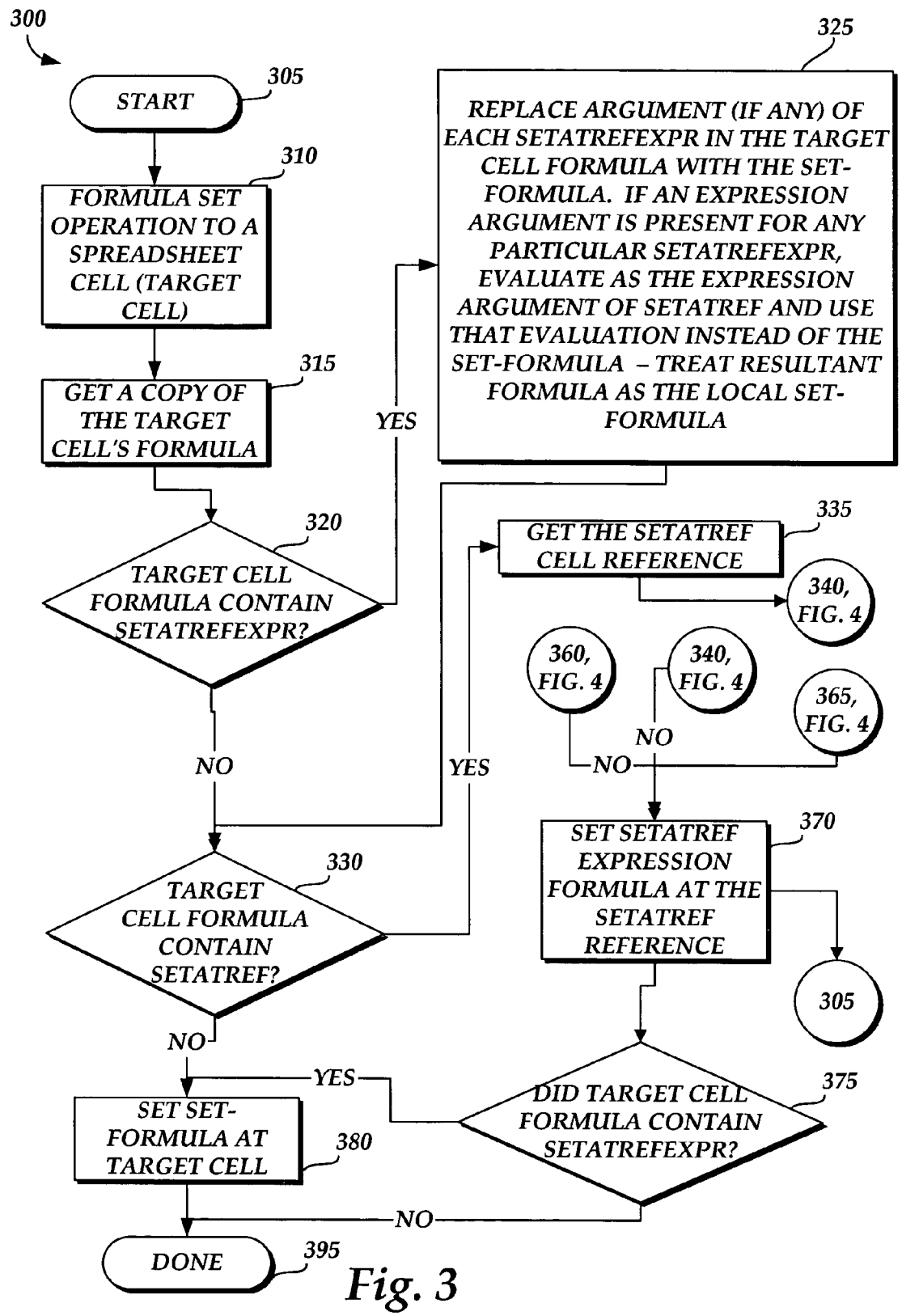
FIGS. 3 and 4 are flow diagrams illustrating an illustrative routine for formulaically redirecting and modifying formula set operations in a spreadsheet application.
Figure 4:
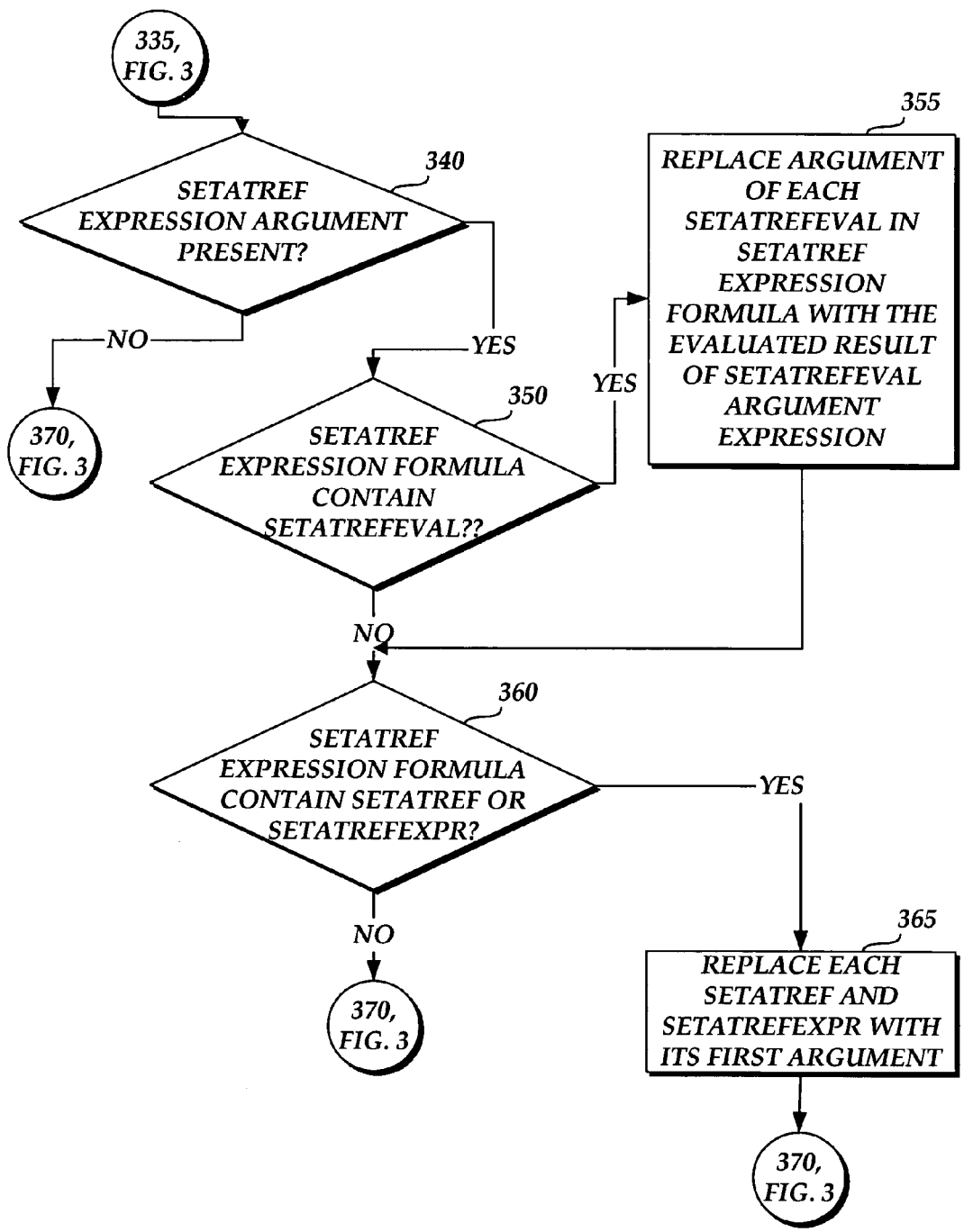

FIGS. 3 and 4 are flow diagrams illustrating an illustrative routine for formulaically redirecting and modifying formula set operations in a spreadsheet application. For purposes of illustration only, the illustrative routine shown in FIGS. 3 and 4 will be described in terms of the inventory example described above with reference to FIG. 2. The routine 300 begins at start block 305 where the user desires to manipulate the inventory data described above using the spreadsheet application 210 and spreadsheet worksheet 215. At block 310, a formula set operation is performed to a spreadsheet cell, as described above. For example, at block 310, the user enters a value of 200 inventory units into the cell A2 (230).

At block 315, the spreadsheet application 210 obtains a copy of formulas contained in the target cell (for example, cell A2). A copy of the formulas entered into the target cell is obtained by the spreadsheet application 210 so that the spreadsheet application 210 may determine what actions are required by the formulas contained therein or in response to the formulas contained therein. At block 320, a determination is made by the spreadsheet application 210 as to whether the target cell formula contains a SETATREFEXPR function.

If the target cell formula contains a SETATREFEXPR function, the routine moves to block 325, and appropriate arguments of the SETATREFEXPR functions contained in a target cell formula are replaced with the formula or data set by the user, for example 200 inventory units. If an expression argument is present for any particular SETATREEXPR, then it is evaluated as the expression argument of SETATREF and that evaluation is used instead of the set-formula. According to an embodiment of the invention, SETATREFEXPR expressions inside a target cell formula are replaced first to ensure proper evaluation. For example, consider a target cell formula of SETATREFEXPR(width*0.2, width*SETATREFEVAL(SETATREFEXPR( )/width)). Consider that the formula "5" is set into the cell containing this formula. The "first" or inner SETATREFEXPR is processed such that the formula becomes SETATREFEXPR (width*0.2,width*SETATREFEVAL(SETATREFEXPR(5)/width)). The "second" or outer SETATREFEXPR is next processed. A SETATREFEVAL (described below) is present, so the phrase "SETATREFEXPR(5)/width" is evaluated. If, for example, width is 10−5/10=0.5, then the formula set in the first argument of the "second" SETATREFEXPR is "width*0.5." The set-formula for the cell becomes SETATREFEXPR(width*0.5,width*SETATREFEVAL (SETATREFEXPR(5)/width)). The resultant formula is treated as the local set-formula. As should be understood, replacement of arguments in the SETATREFEXPR function at block 325 may be an iterative process whereby any required arguments in any of a plurality of SETATREFEXPR functions entered into the target cell may be modified as required by data or a formula set to the target cell by the user. The routine then proceeds to block 330 as described below.

Returning back to block 320, if the target cell does not contain a SETATREFEXPR function, the routine moves to block 330, and a determination is made as to whether the target cell formula contains a SETATREF function. If not, the method proceeds to block 380, and the formula or value set by the user is entered into the target cell. For example, if no SETATREF function is present in the target cell, the value of 200 inventory units is entered into the target cell as specified by the user.

If the target cell does contain a SETATREF function, the routine proceeds to block 335. At block 335, the spreadsheet application 210 obtains the SETATREF function cell reference. For example, because the user has entered data (200 inventory units) into cell A2, the spreadsheet application 210 must obtain any SETATREF function cell reference referred to by the formulas or data contained in cell A2. For example, referring to the inventory example above, the formula contained in cell A2 is linked to cell A1 by the formulas contained in cell A1. Accordingly, at block 335, the spreadsheet application 210 obtains the SETATREF function cell reference of cell A1.

At block 340, FIG. 4, a determination is made as to whether the SETATREF function or expression contains a second argument. If so, the routine moves to block 350, and a determination is made as to whether the SETATREF function contains a SETATREFEVAL function. If yes, the routine moves to block 355, and the arguments of the SETATREFEVAL function in the SETATREF function are replaced with data entered by the user, and the evaluation function is performed, so that the corresponding argument of the SETATREFEVAL function is replaced with the evaluated result of the SETATREFEVAL function argument. For example, as described above for the inventory example, a value of 40% entered by the user into the SETATREFEVAL function causes a recalculation or evaluation of the SETATREFEVAL function, and the SETATREFEVAL expression argument is replaced in the cell A2 formula with the evaluated result of 400 inventory units.

At block 360, a determination is made as to whether any SETATREF functions in the target cell themselves contain SETATREF or SETATREFEXPR functions. If so, the routine moves to block 365, and each of the SETATREF and SETATREFEXPR functions is replaced with the first arguments of each of the respective functions. For example, following the inventory example above, a SETATREFEXPR expression argument may be replaced with the 20% value of its first argument.

At block 370, the value of the SETATREF formula is set at the SETATREF reference. For example, upon entry of a value of 200 inventory units at cell A2, the resulting SETATREF expression evaluates to a value of 20%. Accordingly, at block 370, the evaluated value of cell A1 is set to 20%. As illustrated in FIG. 3, block 370 illustrates an iterative process that is performed until all SETATREF formulas are set as specified. At block 375, a determination is made as to whether the target cell contains a SETATREFEXPR expression. The routine ends at block 395.

The following are additional examples of the operation of the invention as described herein. As should be appreciated, the following examples are for illustration only and are not limiting of any alternate uses of the functionality described herein. For a first additional example, according to the VISIO spreadsheet application user interface (UI), a user may move a shape text via the control handle or via the text block tool. Prior to SETATREF function of the present invention, the shape developer would have to perform the following functions:

TxtPinX=Guard(Controls.X1)
TxtPinY=Guard(Controls.Y1)

The Guard functions prevent the user from destroying the relationship using the text block tool. This means that the user cannot use the text block tool. With a SETATREF function of the present invention the following functions may be performed. This allows the user to use either the control handle or the text block tool.

TxtPinX=
SETATREF(Controls.X1)
TxtPinY=
SETATREF(Controls.Y1)

Alternatively, the following functions may be used to achieve the same result.

Controls.X1=

SETATREF(TxtPinX)
Controls.Y1=

SETATREF(TxtPinY)

For a second additional example, consider a Text Width Control Handle. This allows the user to change the text width of a VISIO shape using a control handle or using the text block tool. With a SETATREF function of the present invention the following functions may be performed.

Controls.X1=
SETATREF(TxtWidth,SETATREFEVAL(2*SQRT((INTERSE
CTX(TxtPinX,TxtPinY,TxtAngle,SETATREFEXPR( ), GetRef(C
ontrols.TextWidth.Y),TxtAngle+90 deg)–
TxtPinX)^2+(INTERSECTY(TxtPinX,TxtPinY,TxtAngle,SETA TREFEXPR( ),GetRef(Controls.TextWidth.Y), TxtAngle+90
deg)–
TxtPinY)^2)),TRUE)+TxtPinX+TxtWidth*0.5*COS (TxtAngle)
Controls.Y1=
SETATREF(TxtWidth,SETATREFEVAL(2*SQRT((INTERSECTX(TxtPinX,TxtPinY,TxtAngle,GetRef(Controls.
TextWidth),SETATREFEXPR( ),TxtAngle+90 deg)–
TxtPinX)^2+(INTERSECTY(TxtPinX,TxtPinY, TxtAngle, GetRef(Controls.TextWidth), SETATREFEXPR( ),TxtAn gle+90 deg)–
TxtPinY)^2)),TRUE)+TxtPinY+TxtWidth*0.5*SIN (TxtA
ngle)

As described herein, methods and systems are provided for linking the contents of one spreadsheet application cell to other cells so that changes in one cell are reflected in linked cells. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

I claim:

1. A method of formulaically specifying the redirection or modification of a formula in a spreadsheet application at formula set-time, comprising:

setting a spreadsheet formula to a first spreadsheet cell;

in response to setting the spreadsheet formula to the first spreadsheet cell, obtaining a formula previously set to the first spreadsheet cell, wherein prior to obtaining the formula previously set to the first spreadsheet cell, parsing the spreadsheet formula set to the first spreadsheet cell to determine any required evaluation or recalculation caused by the spreadsheet formula set to the first spreadsheet cell, wherein the spreadsheet formula set to the first spreadsheet cell comprises a value to be evaluated by the formula previously set to the first spreadsheet cell;

identifying a cell reference to a second spreadsheet cell in at least one member of a group comprising: the spreadsheet formula set to the first spreadsheet cell and the spreadsheet formula previously set to the first spreadsheet cell;

in response to setting the spreadsheet formula to the first spreadsheet cell, determining whether data associated with the first spreadsheet cell should be redirected to the second spreadsheet cell identified by the cell reference;

redirecting data associated with the first spreadsheet cell to the second spreadsheet cell for entry into the second spreadsheet cell when data associated with the first spreadsheet cell is redirected to the second spreadsheet cell identified by the cell reference, wherein redirecting data associated with the first spreadsheet cell to the second spreadsheet cell includes redirecting data associated with the first spreadsheet cell to the second spreadsheet cell for evaluation by a spreadsheet formula set to the second spreadsheet cell and redirecting data associated with the first spreadsheet cell to the second spreadsheet cell for modifying the spreadsheet formula set to the second spreadsheet cell;

determining whether the spreadsheet formula previously set to the first spreadsheet cell requires evaluation in response to the spreadsheet formula set to the first spreadsheet cell when the data is evaluated by the spreadsheet formula set to the second spreadsheet cell;

evaluating the spreadsheet formula previously set to the first spreadsheet cell in response to the spreadsheet formula set to the first spreadsheet cell when the data is evaluated by the spreadsheet formula set to the second spreadsheet cell; and passing the evaluated result of evaluating the spreadsheet formula previously set to the first spreadsheet cell for evaluation by the spreadsheet formula set to the second spreadsheet cell.

2. The method of claim 1, further comprising determining the cell reference for the second spreadsheet cell from the spreadsheet formula set to the first spreadsheet cell.

3. The method of claim 2, whereby if no cell reference for the second spreadsheet cell is determined from the spreadsheet formula set to the first spreadsheet cell, determining the cell reference for the second spreadsheet cell from the spreadsheet formula previously set to the first spreadsheet cell.

4. The method of claim 1, further comprising passing the evaluated result of evaluating the spreadsheet formula previously set to the first spreadsheet cell for modifying a spreadsheet formula set to the second spreadsheet cell.

5. A computer-readable storage medium having computer-executable instructions for formulaically specifying the redirection or modification of a formula in a spreadsheet application at formula set-time, comprising:

setting a spreadsheet formula to a first spreadsheet cell;

in response to setting the spreadsheet formula to the first spreadsheet cell, obtaining a formula previously set to the first spreadsheet cell, wherein prior to obtaining the formula previously set to the first spreadsheet cell, parsing the spreadsheet formula set to the first spreadsheet cell to determine any required evaluation or recalculation caused by the spreadsheet formula set to the first spreadsheet cell, wherein the spreadsheet formula set to the first spreadsheet cell comprises a value to be evaluated by the formula previously set to the first spreadsheet cell;

identifying a cell reference to a second spreadsheet cell in at least one member of a group comprising: the spreadsheet formula set to the first spreadsheet cell and the spreadsheet formula previously set to the first spreadsheet cell;

in response to setting the spreadsheet formula to the first spreadsheet cell, determining whether data associated with the first spreadsheet cell should be redirected to the second spreadsheet cell identified by the cell reference;

redirecting data associated with the first spreadsheet cell to the second spreadsheet cell for entry into the second spreadsheet cell when data associated with the first spreadsheet cell is redirected to the second spreadsheet cell identified by the cell reference, wherein redirecting data associated with the first spreadsheet cell to the second spreadsheet cell includes redirecting data associated with the first spreadsheet cell to the second spreadsheet cell for evaluation by a spreadsheet formula set to the second spreadsheet cell and redirecting data associated with the first spreadsheet cell to the second spreadsheet cell for modifying the spreadsheet formula set to the second spreadsheet cell;

determining whether the spreadsheet formula previously set to the first spreadsheet cell requires evaluation in response to the spreadsheet formula set to the first spreadsheet cell when the data is evaluated by the spreadsheet formula set to the second spreadsheet cell;

evaluating the spreadsheet formula previously set to the first spreadsheet cell in response to the spreadsheet formula set to the first spreadsheet cell when the data is evaluated by the spreadsheet formula set to the second spreadsheet cell; and passing the evaluated result of evaluating the spreadsheet formula previously set to the first spreadsheet cell for evaluation by the spreadsheet formula set to the second spreadsheet cell.

6. The computer-readable storage medium of claim 5, further comprising determining the cell reference for the second spreadsheet cell from the spreadsheet formula set to the first spreadsheet cell.

7. The computer-readable storage medium of claim 6, whereby if no cell reference for the second spreadsheet cell is determined from the spreadsheet formula set to the first spreadsheet cell, determining the cell reference for the second spreadsheet cell from the spreadsheet formula previously set to the first spreadsheet cell.

8. A system for formulaically specifying the redirection or modification of a formula in a spreadsheet application at formula set-time, comprising:

a processor; and a memory having computer-executable instructions stored thereon, wherein the computer-executable instructions include:

setting a spreadsheet formula to a first spreadsheet cell;

in response to setting the spreadsheet formula to the first spreadsheet cell, obtaining a formula previously set to the first spreadsheet cell, wherein prior to obtaining the formula previously set to the first spreadsheet cell, parsing the spreadsheet formula set to the first spreadsheet cell to determine any required evaluation or recalculation caused by the spreadsheet formula set to the first spreadsheet cell, wherein the spreadsheet formula set to the first spreadsheet cell comprises a value to be evaluated by the formula previously set to the first spreadsheet cell;

identifying a cell reference to a second spreadsheet cell in at least one member of a group comprising: the spreadsheet formula set to the first spreadsheet cell and the spreadsheet formula previously set to the first spreadsheet cell;

in response to setting the spreadsheet formula to the first spreadsheet cell, determining whether data associated with the first spreadsheet cell should be redirected to the second spreadsheet cell identified by the cell reference; and redirecting data associated with the first spreadsheet cell to the second spreadsheet cell for entry into the second spreadsheet cell when data associated with the first spreadsheet cell is redirected to the second spreadsheet cell identified by the cell reference, wherein redirecting data associated with the first spreadsheet cell to the second spreadsheet cell includes redirecting data associated with the first spreadsheet cell to the second spreadsheet cell for evaluation by a spreadsheet formula set to the second spreadsheet cell and redirecting data associated with the first spreadsheet cell to the second spreadsheet cell for modifying the spreadsheet formula set to the second spreadsheet cell;

determining whether the spreadsheet formula previously set to the first spreadsheet cell requires evaluation in response to the spreadsheet formula set to the first spreadsheet cell when the data is evaluated by the spreadsheet formula set to the second spreadsheet cell;

evaluating the spreadsheet formula previously set to the first spreadsheet cell in response to the spreadsheet formula set to the first spreadsheet cell when the data is evaluated by the spreadsheet formula set to the second spreadsheet cell; and passing the evaluated result of evaluating the spreadsheet formula previously set to the first spreadsheet cell for evaluation by the spreadsheet formula set to the second spreadsheet cell.

9. The system of claim 8, further comprising determining the cell reference for the second spreadsheet cell from the spreadsheet formula set to the first spreadsheet cell.

10. The system of claim 9, whereby if no cell reference for the second spreadsheet cell is determined from the spreadsheet formula set to the first spreadsheet cell, determining the cell reference for the second spreadsheet cell from the spreadsheet formula previously set to the first spreadsheet cell.

* * * * *